(12) United States Patent
Yu et al.

(10) Patent No.: US 7,043,370 B2
(45) Date of Patent: May 9, 2006

(54) REAL TIME PROCESSING OF MULTICOMPONENT INDUCTION TOOL DATA IN HIGHLY DEVIATED AND HORIZONTAL WELLS

(75) Inventors: Liming Yu, Stafford, TX (US); Berthold Kriegshäuser, Rio de Janeiro (BR); Otto Fanini, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 194 days.

(21) Appl. No.: 10/652,762

(22) Filed: Aug. 29, 2003

(65) Prior Publication Data

US 2005/0049792 A1    Mar. 3, 2005

(51) Int. Cl.
*G01V 3/18* (2006.01)
(52) U.S. Cl. ............................. 702/7; 703/10
(58) Field of Classification Search ............... 702/7, 702/1–6, 8–14; 324/339, 343; 174/24; 175/24, 175/25–27, 39; 73/152.46, 152.47, 152.48; 703/10
See application file for complete search history.

(56) References Cited

U.S. PATENT DOCUMENTS

| | | | | |
|---|---|---|---|---|
| 4,360,777 A * | 11/1982 | Segesman | ................... | 324/339 |
| 4,837,517 A | 6/1989 | Barber | ....................... | 324/339 |
| 5,157,605 A | 10/1992 | Chandler et al. | ........... | 364/422 |
| 5,446,654 A | 8/1995 | Chemali et al. | ............ | 364/422 |
| 5,452,761 A | 9/1995 | Beard et al. | ................ | 166/250 |
| 5,774,360 A | 6/1998 | Xiao et al. | ..................... | 702/6 |
| 5,842,149 A * | 11/1998 | Harrell et al. | ................ | 702/9 |
| 5,867,806 A | 2/1999 | Strickland et al. | ............. | 702/7 |
| 5,999,883 A | 12/1999 | Gupta et al. | ................... | 702/7 |
| 6,049,209 A | 4/2000 | Xiao et al. | ................... | 324/339 |
| 6,147,496 A | 11/2000 | Strack et al. | ............... | 324/343 |
| 6,206,108 B1 * | 3/2001 | MacDonald et al. | .......... | 175/24 |
| 6,233,524 B1 * | 5/2001 | Harrell et al. | ................ | 702/9 |
| 6,393,364 B1 * | 5/2002 | Gao et al. | ...................... | 702/7 |
| 6,584,408 B1 * | 6/2003 | Omeragic | ...................... | 702/7 |
| 6,643,589 B1 * | 11/2003 | Zhang et al. | .................. | 702/7 |
| 6,727,696 B1 * | 4/2004 | Kruspe et al. | .............. | 324/303 |
| 6,794,875 B1 * | 9/2004 | Strickland | .................... | 324/343 |

\* cited by examiner

*Primary Examiner*—Michael Nghiem
*Assistant Examiner*—Victor J. Taylor
(74) *Attorney, Agent, or Firm*—Madan, Mossman & Sriram, P.C.

(57) ABSTRACT

A method is discussed for obtaining resistivity values in a horizontal or highly-deviated wellbore penetrating an anisotropic formation layer. Multi-component data is obtained from the formation layer. An initial value of horizontal and vertical resistivity can be determined by using a whole space model and assuming an isotropic layer. Revised values of the vertical and horizontal resistivities are obtained through a first and second inversion process. A first inversion is performed on the horizontal resistivity, holding a value of vertical resistivity constant. A second inversion is performed on the vertical resistivity, holding a value of horizontal resistivity constant. These inversions are iterated until a desired convergence is achieved.

40 Claims, 4 Drawing Sheets

REAL TIME PROCESSING OF MULTICOMPONENT INDUCTION TOOL DATA IN HIGHLY DEVIATED AND HORIZONTAL WELLS

BACKGROUND OF THE INVENTION

1. Field of the Invention

The invention is related generally to the field of electrical resistivity well logging methods. More specifically, the invention is related to methods for determining resistivity values in a multi-component induction measurement in highly-deviated wells.

2. Description of the Related Art

Electromagnetic induction and wave propagation logging tools are commonly used for the determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p. #148, Society of Petroleum Engineers, Richardson, Tex. (1949). Many improvements and modifications to electromagnetic induction resistivity instruments have been devised since publication of the Doll reference,. Examples of such modifications and improvements can be found, for example, in U.S. Pat. No. 4,837,517; to Barber, U.S. Pat. No. 5,157,605 issued to Chandler, et al.; and U.S. Pat. No. 5,452,761 issued to Beard, et al.

A typical electrical induction instrument is described in U.S. Pat. No. 5,452,761 (Beard.) The induction logging instrument described in Beard includes a number of receiver coils spaced at various axial distances from a transmitter coil. Alternating current is passed through the transmitter coil, which induces alternating electromagnetic fields in the earth formations. Voltages, , are induced in the receiver coils as a result of electromagnetic induction phenomena related to the alternating electromagnetic fields. A continuous record of the voltages form curves. These curves are also referred to as induction logs. Induction instruments that are composed of multiple sets of receiver coils are referred to as multi-array induction instruments. Every set of receiver coils together with the transmitter is considered as a subarray. Hence, a multi-array induction tool comprises numerous subarrays and acquires measurements with all the subarrays.

Voltages induced in axially more distal receiver coils are the result of electromagnetic induction phenomena occurring in a larger volume surrounding the instrument, and voltages induced in axially proximal receiver coils are the result of induction phenomena occurring more proximal to the instrument. Therefore, different receiver coils see a formation layer boundary with different shoulder-bed contributions, or shoulder-bed effects. The longer-spaced receiver coils see the formation layer boundary at further distance from the boundary than the shorter-spaced receiver coils do. As a result, the logs of longer-spaced receiver coils have longer shoulder-bed effects than the logs of shorter-spaced receiver coils. The logs of all the receiver coils form a certain pattern.

Variations of measurements with azimuthal angle can be corrected. If the layers are not perpendicular to the axis of the instrument, the conductivity of the media surrounding the instrument can vary with azimuthal angle, causing any inferences about the conductivity from the measurements of the induction voltage to be in error. A method for correcting this error is described in U.S. Pat. No. 5,774,360 issued to Xiao and Zhou. The method requires the relative dip angle as a priori information. The relative dip angle is the angle between the borehole axis and the normal of the bedding plane. Because the formation layers can also be inclined, the relative dip angle is normally unknown even though the wellbore deviation is known. U.S. Pat. No. 6,049,209 issued to Xiao and Geldmacher teaches another method that has also been developed to interpret induction logs in environments of relative inclination and anisotropy. The method requires the relative dip angle and the anisotropy coefficient as a priori information. The anisotropy coefficient can be defined as the ratio between the resistivity perpendicular to bedding and the resistivity parallel to bedding.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art. These eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument, and therefore their presence will typically be masked by the presence of the conductive layers. The non-conductive layers, layers which are typically hydrocarbon-bearing, are of the most interest to the user. Some earth formations which might be of commercial interest therefore may be overlooked by interpreting a well log made using conventional electromagnetic induction resistivity well logging instruments. The thin layers may correspond to geologically distinct intervals, yet if the laminations are beyond the resolving capability of the logging instrument, it would appear as a single layer (for geophysical purposes). Hence for the purposes of this invention, the term "layer" could include both geological layers and geophysical layers.

U.S. Pat. No. 5,999,883 issued to Gupta, et al., (the "Gupta patent"), the contents of which are fully incorporated herein by reference, discloses a method for determining the horizontal and vertical conductivity of anisotropic earth formations. Measurements are made of electromagnetic signals induced by induction transmitters oriented along three mutually orthogonal axes. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to the direction of the vertical conductivity. The rotated magnitudes are rotated through a negative of the angle of inclination. Horizontal conductivity is calculated from the magnitudes of the receiver signals after the second box of rotation. An anisotropy parameter is calculated from the receiver signal magnitudes after the second box of rotation. Vertical conductivity is calculated from the horizontal conductivity and the anisotropy parameter.

Shoulder bed corrections related to the effect of formations above and below the depth being evaluated also have to be applied to the data. Methods for making these corrections to data acquired with conventional logging tools are well known in the art. For example, U.S. Pat. No. 5,446,654 to Chemali teaches the conversion of a resistivity log as a function of well depth into a rectangularized curve so that the interfaces of the adjacent strata are located, and a suitable number of iterations, a correction factor is applied. The corrected rectangular log is obtained with a correction coefficient computed at each depth. For each computation, the impact of all the strata within a specified depth window is considered, while strata beyond that window are simplified by representing the strata beyond the window with single equivalent bed values to reduce the number of computations required. This then provides a resistivity log which is substantially free of shoulder bed effect.

The method of U.S. Pat. No. 5,867,806 to Strickland, et al. corrects for shoulder bed effect in LWD resistivity logs through inversion. The method selects one or more control depths at one or more locations of each of a plurality of detected beds in the formation. The method then estimates the resistivity of each bed only at the selected control depths to produce an estimated resistivity of the beds. The method then computes a simulated log value at each control depth using a current estimate of the resistivity of the beds. The computer-simulated log is then computed to the actual log data at each control depth, and the resistivity of each bed is adjusted using the difference between the actual and simulated values at the control depths. The method iteratively repeats a plurality of times until the simulated log substantially matches the actual log at the control depths.

Electrically anisotropic reservoirs are encountered frequently in hydrocarbon exploration. For accurate saturation estimation and optimum hydrocarbon recovery from these reservoirs, it is essential to detect and properly describe their electrical properties. For example, in laminated sand-shale sequences or sands with different grain size distributions, the vertical resistivity (perpendicular to the bedding) is more indicative of the hydrocarbon content than the horizontal resistivity (parallel to the bedding). However, the response measured by conventional induction tools with their transmitter-receiver coil moments oriented normal to bedding is dominated by the horizontal resistivity. Therefore, a petrophysical evaluation based on these data can either overlook hydrocarbons present in laminated sands or underestimate their productivity.

The relative formation dip angle is vital for proper and accurate interpretation of data acquired by the new multi-component induction instrument. This newly developed induction instrument comprises three mutually orthogonal transmitter-receiver arrays. These configurations allow us to determine both horizontal and vertical resistivities for an anisotropic formation in vertical, deviated, and horizontal boreholes. A description of the tool can be found in U.S. Pat. No. 6,147,496, to Strack, et al. The transmitters induce currents in all three spatial directions and the receivers measure the corresponding magnetic fields ($H_{xx}$, $H_{yy}$, and $H_{zz}$). In this nomenclature of the field responses, the first index indicates the direction of the transmitter and the second index denotes the receiver direction. As an example, $H_{zz}$ is the magnetic field induced by a z-direction transmitter coil and measured by a z-directed receiver. The z-direction is parallel to the borehole. In addition, the instrument measures all other cross-components of the magnetic fields, i.e., $H_{xy}$, $H_{xz}$, $H_{yx}$, $H_{yz}$, $H_{zx}$, and $H_{zy}$.

The signals acquired by the main receiver coils ($H_{xx}$, $H_{yy}$, and $H_{zz}$) are used to determine both the horizontal and vertical resistivity of the formation. This is done by inverse processing techniques of the data. These inverse processing techniques automatically adjust formation parameters in order to optimize in a least-square sense the data match of the synthetic tool responses with measured data. Required inputs in this process are accurate information of the relative formation dip and relative formation azimuth. This information can be derived using, in addition to the main signals ($H_{xx}$, $H_{yy}$, and $H_{zz}$), the data from the cross-components. In highly deviated wells (70° or higher), skin-depth-corrected single frequency $H_{xx}+H_{yy}$ measurements depend largely on the horizontal resistivity of the formation. The sum of dual frequency $H_{xx}+H_{yy}$ measurements also mainly depends on the horizontal resistivity of the formation.

Prior methods are useful in determining resistivity values in wells where the angle of deviation from vertical is substantially less than 70 degrees. Typically, errors in conductivity values appear in highly-deviated wells. There is a need for a method that obtains a resistivity value in highly-deviated and horizontal wells. The present invention fulfills that need.

SUMMARY OF THE INVENTION

The present invention is a method of logging a subsurface formation comprising a plurality of layers each having a horizontal conductivity and a vertical conductivity. The method is primarily applicable to near horizontal boreholes (i.e., where the borehole axis is within 30 degrees of bedding. Principal component resistivity measurements are obtained (or obtained by coordinate transformation of other suitable measurements). The zz-measurements are used for deriving an initial model of horizontal and vertical resistivities. An anisotropy factor may be assumed for the purposes. Using the initial model and other principal components (xx- and yy-measurements), an updated value of the horizontal resistivity is obtained. Using this updated model, and the zz-measurements, an updated value of the vertical resistivity is obtained. The process may be iterated until convergence is reached.

Skin depth correction may be applied to the measurements. Multiple spacing measurements may be used, as could multifrequency measurements. These improve the convergence. In a preferred embodiment of the invention, the iterative process includes only one variable at a time, greatly speeding up the computation.

DESCRIPTION OF PREFERRED EMBODIMENT

The method of the present invention can be used in, among others, wireline and measurement-while-drilling (MWD) devices. A typical wireline electromagnetic device is shown generally, for example, in U.S. Pat. No. 6,348,792 B1, issued to Beard, et al. An MWD device suitable for use with the present invention is described generally below. Items of particular importance to wireline and MWD devices will be pointed out where appropriate.

Figure 1:
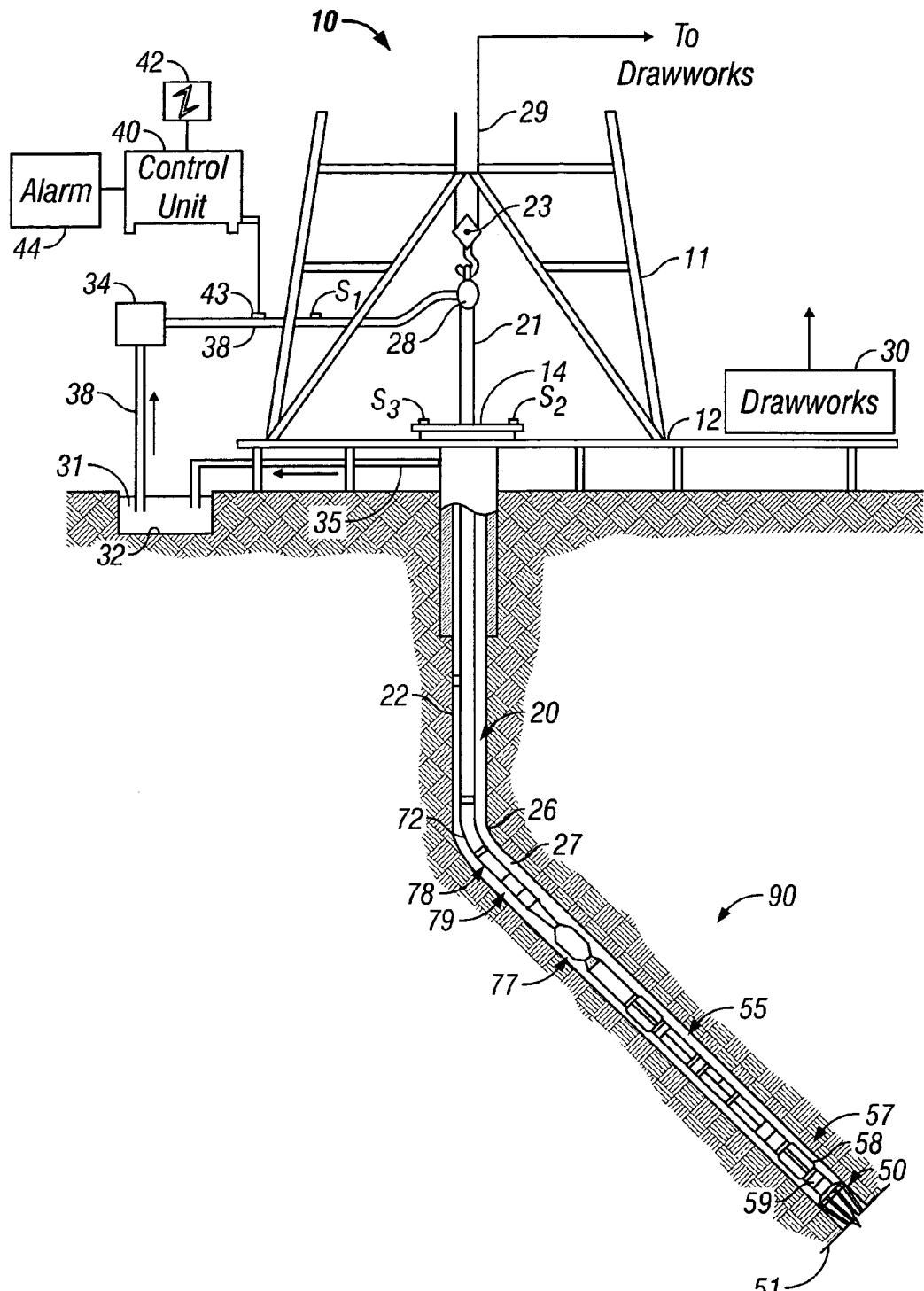
FIG. 1 (Prior Art) shows a measurement-while-drilling tool suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry, and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
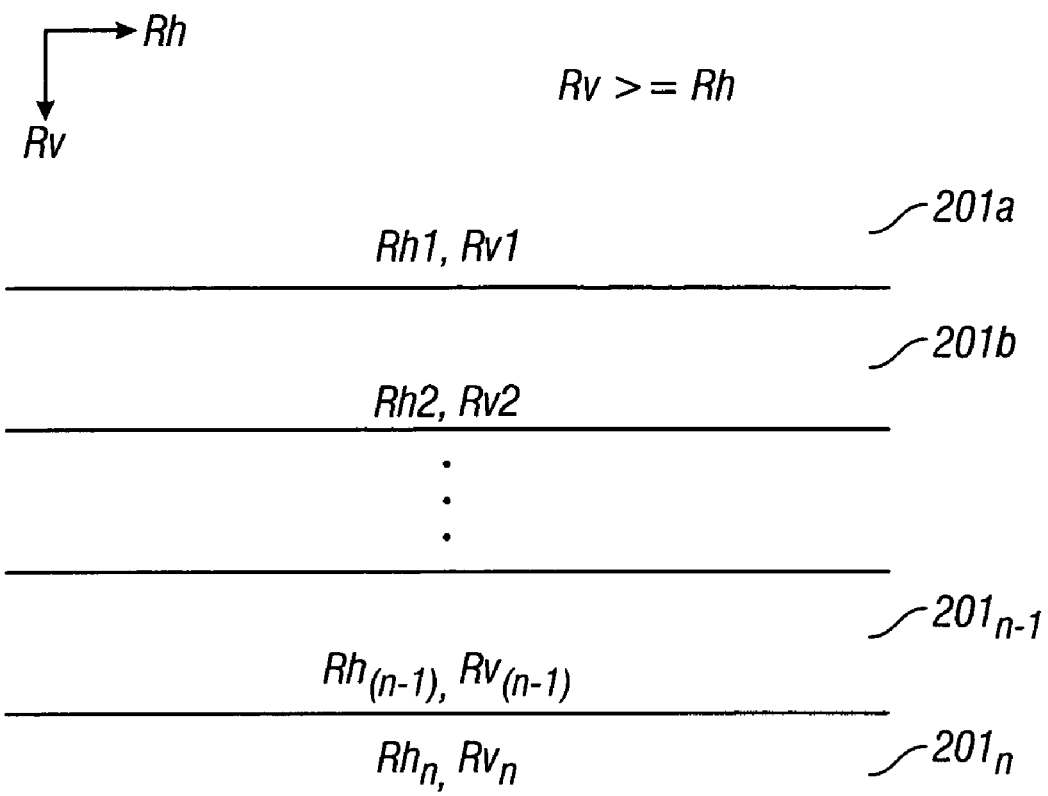
FIG. 2 (Prior Art) depicts a multi-layer model of an anisotropic resistivity formation.

FIG. 2 shows an earth model usable with the present invention comprising multi-layers, labeled 201a, 201b, . . . , 201n–1, 201n. Each layer is transversely isotropic, having horizontal and vertical resistivities. The vertical resistivity is the resistivity for a current flowing along a line perpendicular to the bed layers. The horizontal resistivity is the resistivity measurement for a current flowing in the plane of the bedding. The vertical resistivity $R_v$ is always greater than or equal to the horizontal resistivity $R_h$.

Whole-space analytical solutions can be found in various prior art (see, for example, Zhdanov, et al., 2001. "Foundations of tensor induction well-logging" Petrophysics, Vol. 42, No. 6, 588–610.). The low frequency response approximation can be treated as a skin-depth-corrected response. As shown below, in horizontal wells, the normalized imaginary components of magnetic field $H_{xx}$, $H_{yy}$ and $H_{zz}$ data are independent of tool rotation The $H_{xx}$ and $H_{yy}$ values depend only on the horizontal resistivity $R_h$, and the $H_{zz}$ value depends on the square root of the product of horizontal and vertical resistivities $\sqrt{R_h R_v}$.

Figure 3:
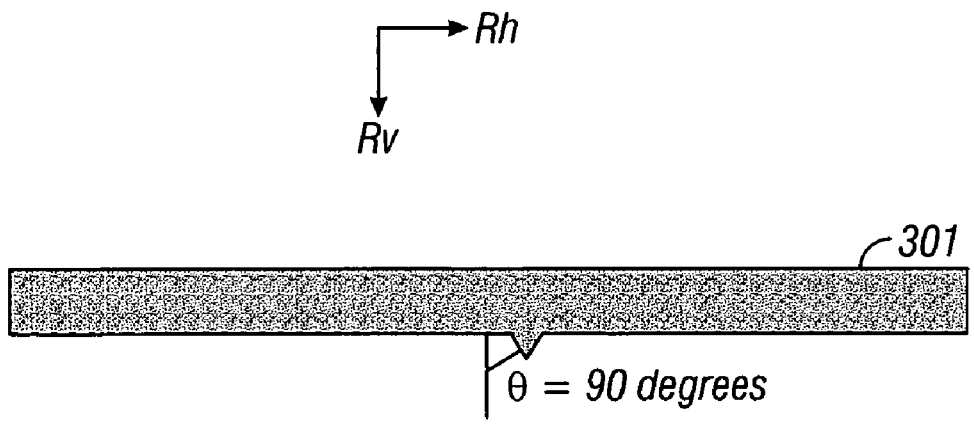
FIG. 3 (Prior Art) shows a horizontal well.

Turning now to FIG. 3, a horizontal well 301 oriented substantially in the plane parallel with the horizontal resistivity $R_h$ is shown. The angle of deviation θ of the horizontal well is 90°. Much of the discussion of the present invention is based on this geometry.

Figure 4:
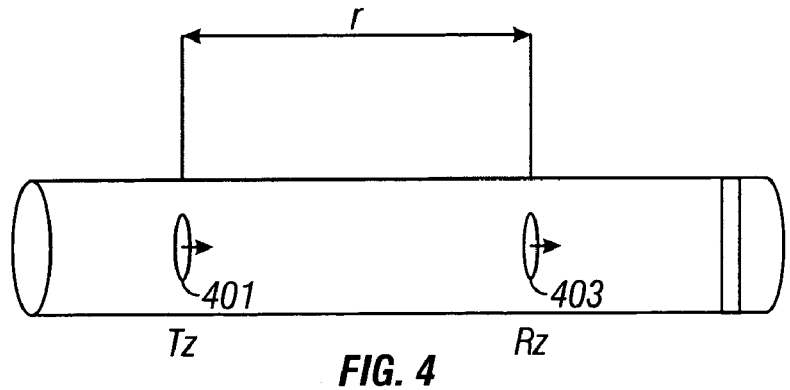
FIG. 4 shows a two-coil configuration of a transmission coil and a receiver coil.

FIG. 4 shows a two-coil configuration in a horizontal position of a measurement device. The two-coil configuration comprises a transmitter 401 and a receiver 403 having a set separation r between them. As illustrated in the figure, the transmitter and receiver are oriented substantially along the longitudinal axis of the device, thereby enabling measurement of the longitudinal component of the magnetic response. Also, the two-coil configuration could be directed perpendicular to the longitudinal axis, enabling measurement of x- and y-components of the magnetic response. The z-axis is parallel to the tool axis and the borehole while the x- and y-axes are orthogonal to each other and to the z-axis.

Figure 5:
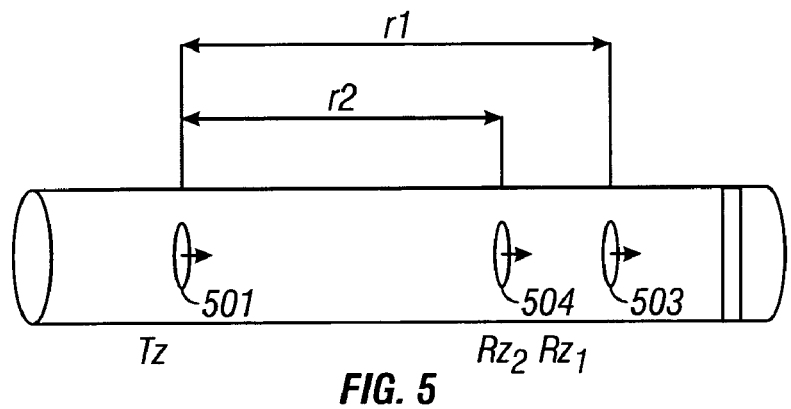
FIG. 5 shows a three-coil configuration of a transmission coil and two receiver coils.

FIG. 5 shows a typical three-coil configuration. The three-coil configuration comprises an array having a transmitter $T_z$ 501 and two receivers $R_{z1}$ 503 and $R_{z2}$ 504. The array is configured such that the tool response in free space is zero. Distance $r_1$ separates $T_z$ and $R_{z1}$, and distance $r_2$ separates $T_z$ and $R_{z2}$. In the figure, the transmitter and the two receivers are directed along the longitudinal axis, thereby enabling measurement of a longitudinal component (z-component) of the magnetic response. This array can be directed perpendicular to the longitudinal axis, thereby enabling measurement of x- and y-components of the magnetic response.

Figure 6:
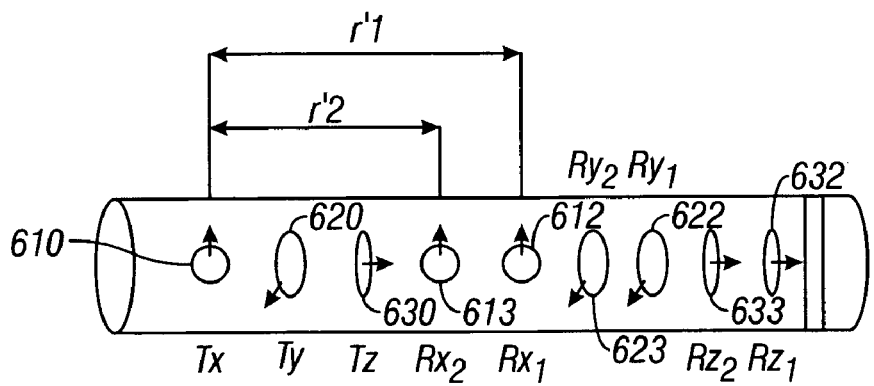
FIG. 6 shows a multi-component configuration for well exploration.

FIG. 6 shows a typical multi-component induction device, comprising three mutually orthogonal transmitter-receiver coil arrays. Transmitter $T_z$ 630 and receivers $R_{z1}$ 632 and $R_{z2}$ 633 are oriented along the longitudinal axis. This coil array can be referred to as the ZZ array. The ZZ array measures $H_z$ components. Similar arrays XX and YY are located axially along the drill tool. Array XX comprises transmitter $T_x$ 610 and receivers $R_{x1}$ 612 and $R_{x2}$ 613. The coils of the XX array are directed substantially perpendicular to the axis of the drill tool. Array YY comprises transmitter $T_y$ 620 and receivers $R_{y1}$ 622 and $R_{y2}$ 623. The coils of the YY array are directed substantially perpendicular to the axis of the drill tool, and substantially perpendicular to the direction of the XX array. The Y-axis is defined to lie in a vertical plane through the tool axis. Measurements can be made for the conventional magnetic field component parallel to the borehole axis, $H_{zz}$, and the two components perpendicular to the wellbore, $H_{xx}$ and $H_{yy}$. It should be noted that the particular orientation of the coils (i.e., along the x-, y- and z-axes is a matter of convenience. Other orientations could also be used and the data recorded therein rotated to the components discussed below. Alternatively, the processing methodology could be used for other coil orientations with a more complicated analysis.

In a horizontal well, a multi-component tool can be used in the manner of a two-coil configuration at a single frequency. The low frequency approximations of the magnetic field components can be given by:

$$\frac{\partial H_{xx}}{M_x} = \frac{\partial H_{yy}}{M_y} \frac{\omega \mu_0}{8\pi r R_h} \quad (1)$$

and $$\frac{\partial H_{zz}}{M_z} = \frac{\omega \mu_0}{4\pi r \sqrt{R_h \times R_v}} \quad (2)$$

where ω is the frequency of the applied field, r is the distance separating transmitter and receiver, $R_h$ is the horizontal conductivity of the formation layer and $R_v$ is the vertical conductivity of the formation layer. $M_x$, $M_y$, and $M_z$ are the magnitudes of the magnetic dipole moments produced in the x-, y-, and z-directions, respectively, and $\Im H_{xx}$, $\Im H_{yy}$, and $\Im H_{zz}$ represents the imaginary component of the $H_{xx}$, $H_{yy}$, and $H_{zz}$ response. Eqs. (1) and (2) demonstrate the characteristics found in whole space solutions. This shows that the $H_{xx}$ and $H_{yy}$ response depends only on $R_h$. These measurements can be taken using the multi-component induction tool of FIG. 6.

In a horizontal well, if a three-coil configuration is now employed at a single frequency, the low frequency approximations of the magnetic field responses obtained using this configuration are given by:

$$\frac{\partial H_{xx}}{M_x} = \frac{\partial H_{yy}}{M_y} \frac{\omega \mu_0}{8\pi r_1 R_h}\left[1 - \left(\frac{r_2}{r_1}\right)^2\right], \quad (3)$$

and $$\frac{\partial H_{zz}}{M_z} = \frac{\omega \mu_0}{4\pi r_1 \sqrt{R_h \times R_v}}\left[1 - \left(\frac{r_2}{r_1}\right)^2\right]. \quad (4)$$

where $r_1$ is the distance separating $T_z$ and $R_{z1}$, and $r_2$ is the distance separating $T_z$ and $R_{z2}$. Eqs. (3) and (4) measure an apparent conductivity corrected for skin depth. $\Im H_{xx}$, $\Im H_{yy}$, and $\Im H_{zz}$ represents the imaginary component of the $H_{xx}$, $H_{yy}$, and $H_{zz}$ response. From Eq. (3), the skin depth corrected apparent conductivity of the $H_{xx}$ and $H_{yy}$ responses depend on $R_h$ for a given spacing of $r_1$ and $r_2$. From Eq. (4), the skin depth corrected apparent conductivity of the zz array is related to the square root of the product of horizontal and vertical resistivities, When the well is not horizontal, these relations become more complex. The responses of xx and yy arrays in a non-horizontal well are functions of borehole deviation θ, tool rotation, and both horizontal and vertical resistivities. The sum $H_{xx}+H_{yy}$ is similarly dependent on borehole deviation and horizontal and vertical resistivities, but is independent of the tool rotation angle. The response of the zz array is a function of the borehole deviation θ and both horizontal and vertical resistivities, but is also independent of the angle of tool rotation. Using the three-coil configuration, a summation of the $H_{xx}$ and $H_{yy}$ responses can be given as $$\frac{\partial H_{xx}}{M_x} + \frac{\partial H_{yy}}{M_y} = \frac{\omega \mu_0}{4\pi r_1' R_h}\left[1-\left(\frac{r_2'}{r_1'}\right)^2\right] \times \left[1 - \frac{\cos^2\theta(\lambda^2-1)}{\lambda\sqrt{\sin^2\theta + \lambda^2\cos^2\theta}}\right] \quad (5)$$

and

-continued $$\frac{\partial H_{zz}}{M_z} = \frac{\omega\mu_0}{4\pi r'_1 \sqrt{R_h \times R_v}} \left[1 - \left(\frac{r'_2}{r'_1}\right)^2\right] \times \sqrt{\sin^2\theta + \lambda^2\cos^2\theta}, \quad (6)$$

where $$\lambda^2 = \frac{R_v}{R_h}.$$

As the contribution of anisotropy is determined by the cos θ function, equations (5) and (6) lose accuracy when the relative deviation θ decreases from 90° (well deviates from horizontal). The sum of $H_{xx}$ and $H_{yy}$ in Eq.(5) mainly depends on the horizontal resistivity $R_h$ at high deviation. Transmitter and receivers spacings are given by $r'_1$ and $r'_2$. As an example, using a the relative deviation of 70 degrees and a horizontal and vertical resistivities of 1 Ω-m and 5 Ω-m respectively, the relative error of the horizontal resistivity computed from equation (5) compared with the results using equation (3) is 17%.

Typically, the near zone effect on the $H_{zz}$ response is small. In contrast, the single frequency responses $H_{xx}$ and $H_{yy}$ are affected by the near zone environment, e.g. borehole mud and tool eccentricity. In addition, in wireline implementations, the effect of a mud cake and an invaded zone can be significant. In highly deviated wells having conductive mud therein, the effect of tool eccentricity can be so large so as to make it impossible to use the single frequency xx and yy array data effectively. On the other hand, studies show that use of dual frequency and multifrequency data can significantly reduce the near zone effect. A dual frequency response leads to the simplest method of processing multi-frequency data. This method is shown in equation (7):

$$H^d = H(f_l) - \frac{f_l}{f_h} H(f_h) \quad (7)$$

where $f_h$ is a high frequency of operation, $f_l$ is a low frequency of operation.

The dual frequency responses of $H_{xx}$ and $H_{yy}$ are not simple functions of the horizontal resistivity. Rather, they are functions of tool rotation and both horizontal and vertical resistivities. However, the summation of xx and yy array dual frequency responses is independent of tool rotation, and the low frequency approximation depends mainly on the horizontal resistivity. For a three-coil configuration in horizontal wells, this summation of xx and yy arrays leads to the dual-frequency response:

$$\frac{\partial H^d_{xx}}{M_x} + \frac{\partial H^d_{yy}}{M_y} = \quad (8)$$

$$\frac{(2\pi f_l \mu_0)^{3/2}}{3\pi R_h^{3/2}} \times \left[1 - \left(\frac{r_2}{r_1}\right)^3\right] \times \left(1 - \sqrt{\frac{f_h}{f_l}}\right) \times \left[1 - \frac{3}{8}\left(1 - \frac{R_h}{R_v}\right)\right].$$

where $f_h$ is a high frequency of operation, and $f_l$ is a low frequency of operation. As shown in Eq. (8), the maximum contribution from anisotropy is 37.5%.

Figure 7:
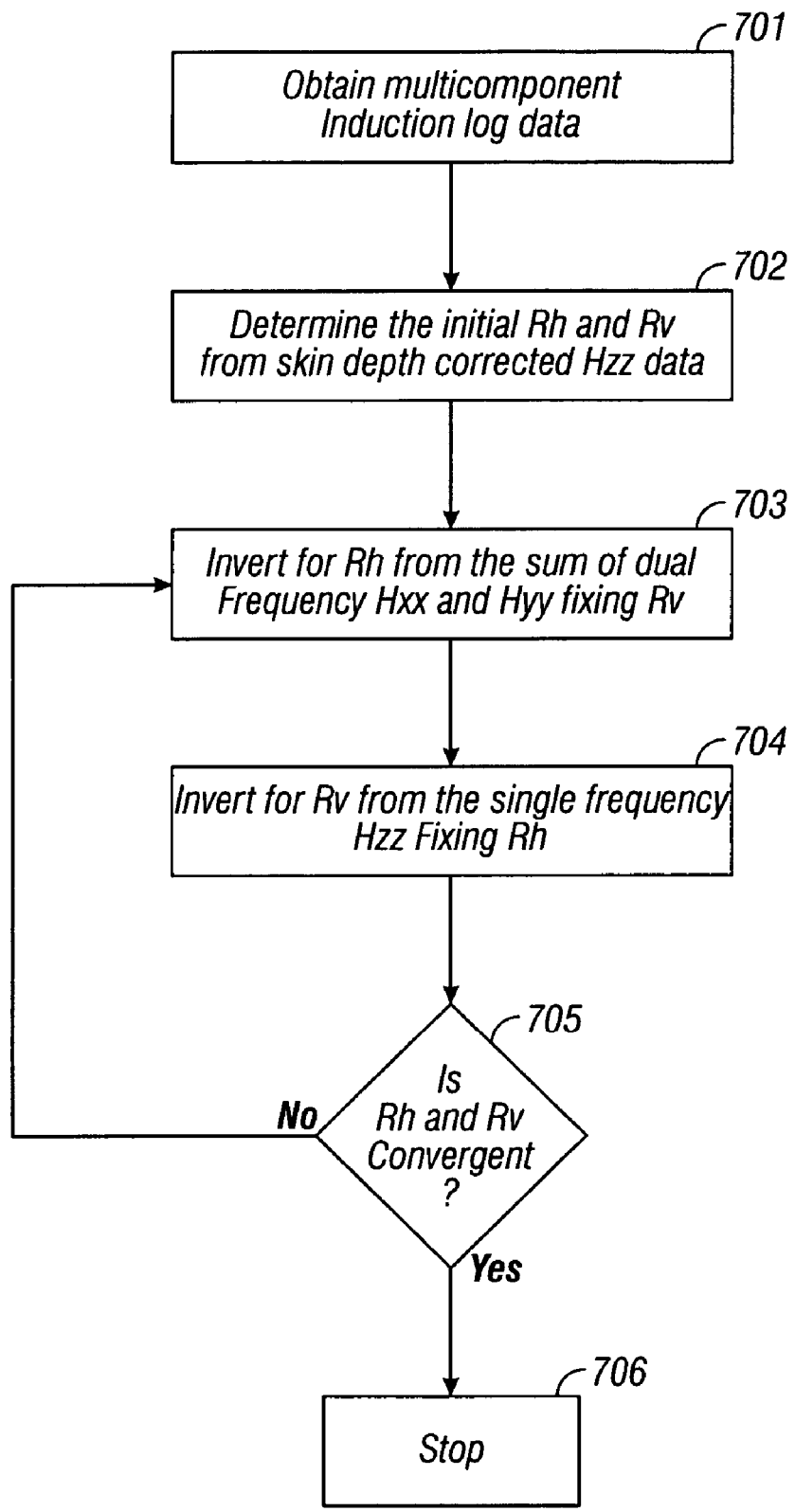
FIG. 7 shows a flowchart outlining a method of the invention.

FIG. 7 shows a flowchart of a preferred mode of the present invention. Analysis is performed on a level-by-level basis assuming a whole space model with transverse isotropy. Box 701 comprises obtaining multi-component induction data. Box 701 can be performed using, for instance, a multi-component tool as shown in FIG. 6, or a 3DEX™ induction tool of Baker Hughes Incorporated. In Box 702, an initial value of $R_h$ and $R_v$ is chosen using the skin depth corrected apparent conductivity obtained from single frequency $H_{zz}$ data. As $H_{zz}$ is dependent on a product of the horizontal and vertical resistivities, an assumption is made of an isotropic medium for this calculation, thereby enabling an initial value of $R_h$ and $R_v$. Alternatively, an anisotropy factor may be assumed, giving an initial values for $R_h$ and $R_v$. It is to be noted that the method of the present invention is quite robust, so that the method described above for determination of the initial model is not essential: almost any initial model can be used without detracting from the method of the invention.

In Box 703, a first inversion for $R_h$ is obtained preferably using a sum of dual frequency $H_{xx}$ and $H_{yy}$ values. Again, using the sum of $H_{xx}$ and $H_{yy}$ values is not essential to the invention. The method of the present invention will also work using $H_{zz}$ and either one of $H_{xx}$ and $H_{yy}$ if the toolface orientation is known. It should also be pointed out that in a horizontal borehole with a sufficiently low frequency of operation of the tool, it is not even necessary to know the toolface orientation. In MWD tools, the tool will be rotating and an orientation sensor is necessary for defining the times at which the x- and y-axes are in a horizontal and vertical plane respectively. An orientation sensor may also be used in wireline devices, though in deviated boreholes, the tool will be in a generally fixed orientation due to gravity. During this first inversion, $R_v$ is held fixed. The horizontal resistivity can be inverted using single frequency values of $H_{xx}$, $H_{yy}$, or the dual frequency value of $H_{xx}+H_{yy}$. Because the sum of dual frequency $H_{xx}$ and $H_{yy}$ has much less near zone effects that the single frequency $H_{xx}$ and $H_{yy}$ measurements, it is preferred in the procedure; whereas, single frequency measurements will require more iterations to produce accurate results. After the first inversion of Box 703 has been performed, a second inversion is performed in Box 704 to obtain a value of $R_v$. The second inversion of Box 704 utilizes the single frequency values of $H_{zz}$ with the value of $R_h$ held fixed.

The orientation sensors may be selected from any of the commonly used sensors such as (i) a magnetometer, (ii) a gyroscope, (iii) an accelerometer, and, (iv) an inclinometer. It should also be pointed out that in a deviated borehole, a wireline logging tool will commonly orient itself in a preferred direction just from gravity alone, and hence an orientation sensor may not be necessary provided the xx- and yy-directions are known relative to the preferred direction for gravity orientation.

The inversions can be performed using a full solution synthetic model to obtain a full solution of the whole space model. Because only one unknown parameter is used in each inversion, an explicit formula can be written. Each subsequent inversion uses an initial $R_h$ determined using an iterative process, e.g:

$$R_h^{m+1} = R_h^m + \Delta R_h^m \quad (9)$$

where $R_h^m$ is the value of the horizontal resistivity at the $m^{th}$ iteration and $\Delta R_h^m$ is the horizontal resistivity correction at the $m^{th}$ iteration. $\Delta R_h^m$ is calculated using:

$$\Delta R_h^m = (J^T J + \alpha)^{-1}(J^T \Delta d) \quad (10)$$

where J is the Jacobian vector comprising derivatives which relate the change in the data to small changes in the horizontal resistivity, α is a damping factor and Δd is the difference between the measured data and the synthetic data obtained from whole space forward modeling. Using Eq. (9), $\Delta R_h^m$ continually updates horizontal resistivity. In most cases, two iterations of the inversion process provide an acceptable degree of accuracy.

In Box 705, a check is made to determine the convergence of the values of $R_h$ and $R_v$ obtained in Box 703 and 704 respectively. If convergence has been sufficiently determined, the method stops (Box 706). Otherwise, the method returns to Box 703 for iteration of the inversion processes of Box 703 and 704. Additional iteration enables improved accuracy of the results. Subsequent initial $R_h$ values are determined using the procedure of Eq. (9).

The advantages of the method of FIG. 7 are found in its extreme speed and the insensitivity of the accuracy to the angle of relative deviation. The method of the present invention typically can process 1000 feet of data level by level on a Sun Microsystems ULTRA 5 computer in about 20 seconds. A typical logging speed is 60 ft/minute, so it can be seen that the method of the present invention is substantially faster than real-time. The whole-space inversion can be implemented as real-time processing software for 3DEX™ data in highly deviated and horizontal wells. This processing is preferably done using a downhole proessor, though any combination of surface and downhole processing may be used.

This processing is applicable for geosteering as the drill bit path is close to the delineating plane of the target-drilling horizon. This processing can be combined with different frequency focusing techniques like dual frequency or multi-frequency processing. An example of such processing can be found, for example in U.S. Pat. No. 6,147,496, issued to Strack ,et al which teaches a dual frequency method and apparatus. The invention also can use frequency-focusing terms like the $k^3$ term of a wave Taylor series expansion, which has been shown to have little near zone effects. An example of such processing can be found, for example in U.S. Pat. No. 6,574,562, issued to Tabarovsky, et al. having the same assignee and the contents of which are incorporated herein by reference. The term "frequency focusing" as used in this invention is intended to include both the dual frequency method described by Strack et al, as well as the more general method taught by Tabarovsky et al. It is to be further noted that the method described in Tabarovsky is not applicable to the case where measurements are made with an electromagnetic logging tool that has a finite and non-zero conductivity. U.S. patent application Ser. No. 10/295,969 of Tabarovsky, having the same assignee as the present application and the contents of which are fully incorporated herein by reference, teaches a frequency focusing method and apparatus that is applicable to the case where the logging tool has a casing with a finite non-zero conductivity. This too is intended to be within the scope of the term "frequency focusing." The induction sonde can also have multiple spacings for depth of investigation focusing and the coils can have an arbitrary orientation to capture the essential components of the electromagnetic signal in the formation. A method of rotating to appropriate coordinate systems is discussed, for example, in U.S. patent application Ser. No. 10/302,239, filed on Nov. 22, 2002. Optionally, this data can be transformed into equivalent orthogonal coil measurements to be processed. Care should be taken to distinguish the shoulder bed effect. Error due to this effect typically occurs in the resistive layers that are embedded within the conductive layers above and below.

U.S. patent application Ser. No. 10/072,173 (now U.S. Pat. No. 6,636,045) of Tabarovsky et al having the same assignee as the present invention teaches a method in which a a subset of the measurements is used to determine the horizontal resistivity of the earth formations. The determined horizontal resistivities are used in a model for inversion of another subset of the data to obtain the vertical formations resistivities. The method of the Tabarovsky '173 application may be used for any borehole inclination and requires a full-fledged inversion of several components of data, including the cross components wherein the transmitter and receiver have different orientations. In contrast, the present invention is applicable only when the inclination angle is large: typically, the borehole axis is within 30° of the bedding plane. As noted above, the method of the present invention is computationally fast, and can be used with only the principal component measurements (i.e., the xx, yy, and zz components). The analysis described above made use of these principal components. As noted above, any set of components could be used as long as the three principal components can be recovered using standard coordinate rotation methods.

The preferred algorithm of the present invention has been tested on synthetic data and on field data. Synthetic data was generated using both a whole-space model and a layered model. Field data was obtained using a multicomponent induction tool in a customer well.

Table 1 shows the results of the applied method using the whole space model at a given deviation angle (80°). The horizontal resistivity is 1 Ω-m and the vertical resistivity is varied over a range (1 Ω-m to 100 Ω-m). The anisotropy ratio, which is $R_v/R_h$, therefore varies from 1 to 100. Table 2 shows results with the same set of horizontal and vertical resistivities taken at a different relative deviation angle of 70°. Finally, Table 3 shows results at a deviation angle of 65°.

TABLE 1

80° deviation

| True Rh | Inverted Rh | Relative error % | True Rv | Inverted Rv | Relative error % |
|---|---|---|---|---|---|
| 1.00 | 0.9994 | 0.0552 | 1.00 | 1.0122 | −1.2213 |
| 1.00 | 0.9999 | 0.0078 | 4.00 | 4.0393 | −0.9822 |
| 1.00 | 0.9971 | 0.2941 | 9.00 | 9.0818 | −0.9087 |
| 1.00 | 0.9940 | 0.6010 | 16.00 | 16.1234 | −0.7713 |
| 1.00 | 0.9914 | 0.8641 | 25.00 | 25.1666 | −0.6666 |
| 1.00 | 0.9894 | 1.0624 | 36.00 | 36.2600 | −0.7223 |
| 1.00 | 0.9877 | 1.2329 | 49.00 | 49.3255 | −0.6643 |
| 1.00 | 0.9862 | 1.3839 | 64.00 | 64.4313 | −0.6739 |
| 1.00 | 0.9848 | 1.5231 | 81.00 | 81.4893 | −0.6041 |
| 1.00 | 0.9835 | 1.6496 | 100.00 | 100.5426 | −0.5426 |

TABLE 2

70° deviation

| True Rh | Inverted Rh | Relative error % | True Rv | Inverted Rv | Relative error % |
|---|---|---|---|---|---|
| 1.00 | 0.9979 | 0.2149 | 1.00 | 1.0149 | −1.4936 |
| 1.00 | 0.9987 | 0.1304 | 4.00 | 4.0361 | −0.9016 |
| 1.00 | 0.9993 | 0.0724 | 9.00 | 9.0801 | −0.8896 |
| 1.00 | 0.9998 | 0.0176 | 16.00 | 16.1265 | −0.7908 |
| 1.00 | 1.0005 | −0.0478 | 25.00 | 25.2483 | −0.9931 |
| 1.00 | 1.0012 | −0.1175 | 36.00 | 36.3221 | −0.8948 |

TABLE 2-continued

70° deviation

| True Rh | Inverted Rh | Relative error % | True Rv | Inverted Rv | Relative error % |
|---|---|---|---|---|---|
| 1.00 | 1.0019 | −0.1930 | 49.00 | 49.3018 | −0.6159 |
| 1.00 | 1.0027 | −0.2707 | 64.00 | 64.5275 | −0.8243 |
| 1.00 | 1.0035 | −0.3515 | 81.00 | 81.4058 | −0.5010 |
| 1.00 | 1.0044 | −0.4361 | 100.00 | 100.6267 | −0.6267 |

TABLE 3

65° deviation

| True Rh | Inverted Rh | Relative error % | True Rv | Inverted Rv | Relative error % |
|---|---|---|---|---|---|
| 1.00 | 0.9964 | 0.3605 | 1.00 | 1.0174 | −1.7446 |
| 1.00 | 1.0104 | −1.0360 | 4.00 | 3.9736 | 0.6588 |
| 1.00 | 1.0243 | −2.4329 | 9.00 | 8.8686 | 1.4606 |
| 1.00 | 1.0382 | −3.8234 | 16.00 | 15.5536 | 2.7898 |
| 1.00 | 1.0523 | −5.2268 | 25.00 | 23.8972 | 4.4112 |
| 1.00 | 1.0664 | −6.6401 | 36.00 | 33.6467 | 6.5370 |
| 1.00 | 1.0807 | −8.0667 | 49.00 | 44.7809 | 8.6104 |
| 1.00 | 1.0951 | −9.5077 | 64.00 | 56.9753 | 10.9761 |
| 1.00 | 1.1096 | −10.9643 | 81.00 | 69.9713 | 13.6157 |
| 1.00 | 1.1243 | −12.4271 | 100.00 | 83.5903 | 16.4097 |

For the relative deviation of 80 degrees and above (Table 1), the relative errors of inverted horizontal and vertical resistivities are less than or approximately 1%. For the relative deviation of 70 degrees, (Table 2) the relative errors of inverted horizontal and vertical resistivities are less than 2%. For a relative deviation of 65 degrees (Table 3), the relative errors increase with an increase in the anisotropy ratio. In most real situations, the anisotropy ratio will be less than 10. Similar results can be obtained through an increase in the horizontal resistivity. The anisotropy ratio is a determining factor.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method of logging a subsurface formation comprising a plurality of layers, each having a horizontal resistivity and a vertical resistivity, the method comprising;
   (a) conveying an electromagnetic logging tool into a deviated borehole in the subsurface formation;
   (b) obtaining principal component measurements from measurements made by said logging tool;
   (c) obtaining an initial model of said horizontal and vertical resistivities;
   (d) using said model and only a subset of the principal components measurements for determining an updated value of said horizontal resistivity;
   (e) obtaining from only another subset of the principal component measurements and said updated value of said horizontal resistivity an updated value of said vertical resistivity.

2. The method of claim 1 wherein obtaining said principal component measurements further comprises:
   (i) making measurements with said electromagnetic tool at a plurality of transmitter-receiver orientations, and
   (ii) performing a coordinate transformation thereon.

3. The method of claim 1 wherein obtaining said initial model further comprises applying a skin effect correction.

4. The method of claim 1 wherein said obtaining said initial model further comprises assuming a value for a ratio of said horizontal and vertical conductivity.

5. The method of claim 1 wherein obtaining said principal component measurements further comprises making measurements with said electromagnetic tool at a plurality of transmitter-receiver spacings.

6. The method of claim 1 wherein obtaining said principal component measurements further comprises making measurements with said electromagnetic tool at a plurality of frequencies.

7. The method of claim 6 wherein obtaining said principal component measurements further comprises applying a frequency focusing.

8. The method of claim 6 wherein the number of said frequencies is two.

9. The method of claim 1 further comprising conveying said electromagnetic logging tool into the borehole on one of (i) a wireline, and (ii) a drilling tubular.

10. The method of claim 1 further comprising repeating (a)–(e) at a plurality of depths in the borehole.

11. The method of claim 7 wherein applying said frequency focusing further comprises using a Taylor series expansion.

12. The method of claim 1 wherein said borehole axis is deviated by about 65° or more to a normal to a layer boundary in said formation.

13. The method of claim 12 wherein said borehole is substantially horizontal.

14. The method of claim 1 wherein the subset comprises at least one of (i) an xx-measurement, and (ii) a yy-measurement, and the another subset comprises a zz-measurement.

15. The method of claim 1 further comprising using an orientation sensor for determining a toolface orientation of said logging tool.

16. The method of claim 14 wherein obtaining said initial model further comprises using said xx-measurement.

17. The method of claim 14 wherein obtaining said at least one additional measurement further comprises obtaining both xx- and y-measurements.

18. The method of claim 17 wherein determining said horizontal resistivity further comprises using a sum of said xx- and yy-measurements.

19. The method of claim 15 wherein said orientation sensor is selected from the group consisting of (i) a magnetometer, (ii) a gyroscope, (iii) an accelerometer, and (iv) an inclinometer.

20. The method of claim 1 further comprising using a processor for performing at least one of operations selected from (b),(c),(d) and (e).

21. The method of claim 19 wherein said processor is located at a downhole location.

22. The method of claim 19 wherein said processor performs said at least one operation substantially in real time.

23. A system for logging a subsurface formation comprising a plurality of layers each having a horizontal resistivity and a vertical resistivity, the system comprising:
   (a) a logging tool conveyed in a deviated borehole in the earth formation, the logging tool having a plurality of transmitters and receivers, at least one of said plurality of transmitters and receivers having an axis inclined to a longitudinal axis of said logging tool, said transmitters conveying an electromagnetic signal into said subsurface formation, said receivers receiving resulting signals from an interaction of said transmitted signals with said subsurface formation;
(b) a processor which determines principal component measurements from said received signals;
(c) a processor which obtains an initial model of said horizontal and vertical resistivities;
(d) a processor which uses said model and only a subset of the principal component measurements and determines an updated value of said horizontal resistivity;
(e) a processor which determines only from another subset of the principal component measurements and said updated value of said horizontal resistivity an updated value of said vertical resistivity.

24. The system of claim 23 wherein the same processor is used for (b)–(e).

25. The system of claim 24 wherein said same processor is at a downhole location.

26. The system of claim 23 wherein said processor in (d) performs a coordinate transformation thereon.

27. The system of claim 23 wherein obtaining said initial model further comprises applying a skin effect correction.

28. The system of claim 23 wherein said received signals are associated with a plurality of transmitter-receiver spacings.

29. The system of claim 23 wherein said transmitters operate at a plurality of frequencies.

30. The system of claim 24 wherein said transmitters operate at a plurality of frequencies.

31. The system of claim 30 wherein said same processor further applies a frequency focusing.

32. The system of claim 30 wherein said plurality of frequencies is two.

33. The system of claim 23 further comprising a conveyance device selected from (i) a wireline, and (ii) a drilling tubular for conveying said logging tool into a borehole in said subsurface formation.

34. The system of claim 31 wherein applying said frequency focusing further comprises using a Taylor series expansion.

35. The system of claim 23 further comprising an orientation sensor which determines a toolface orientation of said logging tool.

36. The apparatus of claim 23 wherein the subset comprises at least one of (i) an xx-measurement, and (ii) a yy-measurement, and the another subset comprises a zz-measurement.

37. The system of claim 35 wherein said orientation sensor is selected from the group consisting of (i) a magnetometer, (ii) a gyroscope, (iii) an accelerometer, and, (iv) an inclinometer.

38. The system of claim 36 wherein determining said updated value of said horizontal resistivity further comprises using a sum of said xx- and yy-measurements.

39. The system of claim 24 wherein said same processor performs (b)–(e) substantially in real time.

40. A system for determining in real time a horizontal conductivity and a vertical conductivity of an subsurface formation having a plurality of layers, the system comprising:
(a) a logging tool having a plurality of transmitters and receivers, at least one of said plurality of transmitters and receivers having an axis inclined to a longitudinal axis of said logging tool, said transmitters conveying an electromagnetic signal into said subsurface formation, said receivers receiving signals resulting from an interaction of said transmitted signals with said subsurface formation;
(b) a processor which determines from said received signals zz-measurements and at least one additional measurement selected from an xx-measurement and a yy-measurement (principal components);
(c) a processor which determines in real time said horizontal and vertical resistivity in real time only from said principal component measurements.

* * * * *